(12) United States Patent
Sone et al.

(10) Patent No.: US 9,819,123 B2
(45) Date of Patent: Nov. 14, 2017

(54) CONNECTOR WITH A HOUSING HAVING WINGS DISPLACEABLY MOUNTED IN SURROUNDING PORTIONS OF A SUPPORT TO FACILITATE ALIGNMENT WITH A MATING HOUSING

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kosuke Sone, Mie (JP); Hiroyoshi Maesoba, Mie (JP); Tomohide Maki, Mie (JP); Katsushi Miyazaki, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRICAL INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/114,416

(22) PCT Filed: Jan. 27, 2015

(86) PCT No.: PCT/JP2015/052121
§ 371 (c)(1),
(2) Date: Jul. 27, 2016

(87) PCT Pub. No.: WO2015/122266
PCT Pub. Date: Aug. 20, 2015

(65) Prior Publication Data
US 2016/0344137 A1 Nov. 24, 2016

(30) Foreign Application Priority Data
Feb. 17, 2014 (JP) ................. 2014-027687

(51) Int. Cl.
*H01R 13/631* (2006.01)
*F16H 61/00* (2006.01)

(52) U.S. Cl.
CPC ...... *H01R 13/6315* (2013.01); *F16H 61/0006* (2013.01); *B60Y 2410/115* (2013.01); *H01R 2201/26* (2013.01)

(58) Field of Classification Search
CPC ............. H01R 13/6315; H01R 13/631; H01R 2201/26; F16H 61/0006; B60Y 2410/115
(Continued)

(56) References Cited

U.S. PATENT DOCUMENTS

2016/0341327 A1* 11/2016 Maki ................ F16K 31/06

FOREIGN PATENT DOCUMENTS

| JP | 2005-190720 | 7/2005 |
| JP | 2010-216552 | 9/2010 |

(Continued)

OTHER PUBLICATIONS

Machine translation for JP 2010 267 488.*
International Search Report.

*Primary Examiner* — Harshad Patel
(74) *Attorney, Agent, or Firm* — Gerald E. Hespos; Michael J. Porco; Matthew T. Hespos (57) ABSTRACT

It is aimed to smoothly proceed with a connecting operation of a connector (10) and improve assembling operability. The connector (10) includes a housing (20) connectable to a mating housing (80) disposed on a solenoid (40), and a swing support portion (61) arranged on a side where a valve body (50) to be mounted with the solenoid (40) is located and configured to support the housing (20) swingably in a (Continued)

direction intersecting with a connecting direction and cause the housing (20) to be connected to the mating housing (80) as the solenoid (40) is mounted into the valve body (40).

4 Claims, 9 Drawing Sheets

(58) Field of Classification Search
USPC .......................................................... 439/248
See application file for complete search history.

(56) References Cited

FOREIGN PATENT DOCUMENTS

| | | |
|---|---|---|
| JP | 2010-267488 | 11/2010 |
| WO | 2007/069307 | 6/2007 |

* cited by examiner

CONNECTOR WITH A HOUSING HAVING WINGS DISPLACEABLY MOUNTED IN SURROUNDING PORTIONS OF A SUPPORT TO FACILITATE ALIGNMENT WITH A MATING HOUSING

BACKGROUND

1. Field of the Invention

The present invention relates to a connector.

2. Description of the Related Art

A connector of Japanese Unexamined Patent Publication No. 2005-190720 includes a housing (plug connector housing) connectable to a mating housing (receptacle connector housing). The housing includes a plurality of resilient locking portions. The housing is supported on a panel partition wall swingably in a direction perpendicular to a connecting direction by being inserted into a hole provided on the panel partition wall and bringing each resilient locking portion into contact with a peripheral edge part of the hole.

The above conventional connector can absorb a connection error of the two housings by the housing being swingably displaced in the direction perpendicular to the connecting direction via each resilient locking portion with the housing inserted in the hole on the panel partition wall. Thus, the technique of the above connector cannot be substantially applied in the absence of a structure equivalent to the hole of the panel partition wall. For example, in the case of a hydraulic control device of an automatic transmission in which a connector is mounted together with an electronic control unit, a hydraulic sensor and the like, the entire configuration is complicated. Thus, if an operation of connecting the housing to the mating housing takes time, it also affects an assembling operation of other components, thereby presenting a problem of drastically reducing operation efficiency.

The present invention was completed based on the above situation and aims to smoothly proceed with a connector connecting operation and improve assembling operation efficiency.

SUMMARY

The present invention is directed to a connector with a housing connectable to a mating housing disposed on a solenoid, and a swing support portion arranged on a side where a valve body to be mounted with the solenoid is located and configured to support the housing swingably in a direction intersecting with a connecting direction and cause the housing to be connected to the mating housing as the solenoid is mounted into the valve body.

Since the housing and the mating housing are connected when the solenoid is mounted into the valve body, it is not necessary to separately perform a mounting operation of the solenoid and a connecting operation of the connector and assembling operation efficiency is improved. Even if the housing is displaced from a proper connection position to the mating housing when the solenoid is mounted into the valve body, a displacement of the housing is absorbed by the swing support portion, wherefore the connecting operation of the connector can smoothly proceed. The swing support portion may be integral to a cover for covering a wire pulled out from the housing. Accordingly, the configuration is simplified and the number of components is reduced as compared to the case where the swing support portion and the cover are provided separately.

Two wings are provided to project on opposite side surfaces of the housing. The swing support portion includes two surrounding portions for surrounding the wings and the wings are accommodated displaceably in the surrounding portions. Accordingly, the swing support portion can be configured relatively simply.

The wings may be twisted and deformed in a direction intersecting the connecting direction when the housing swings according to a movement of the mating housing and have resilience capable of cancelling a twisted state thereof. A displacement between the two housings can be properly corrected by the wings having such resilience.

DETAILED DESCRIPTION

An embodiment of the present invention is described on the basis of the drawings. A connector 10 of this embodiment illustrated is provided in a hydraulic control device 90 of an automatic transmission of an automotive vehicle and includes housings 20 made of synthetic resin and a cover 60 likewise made of synthetic resin.

Figure 1:
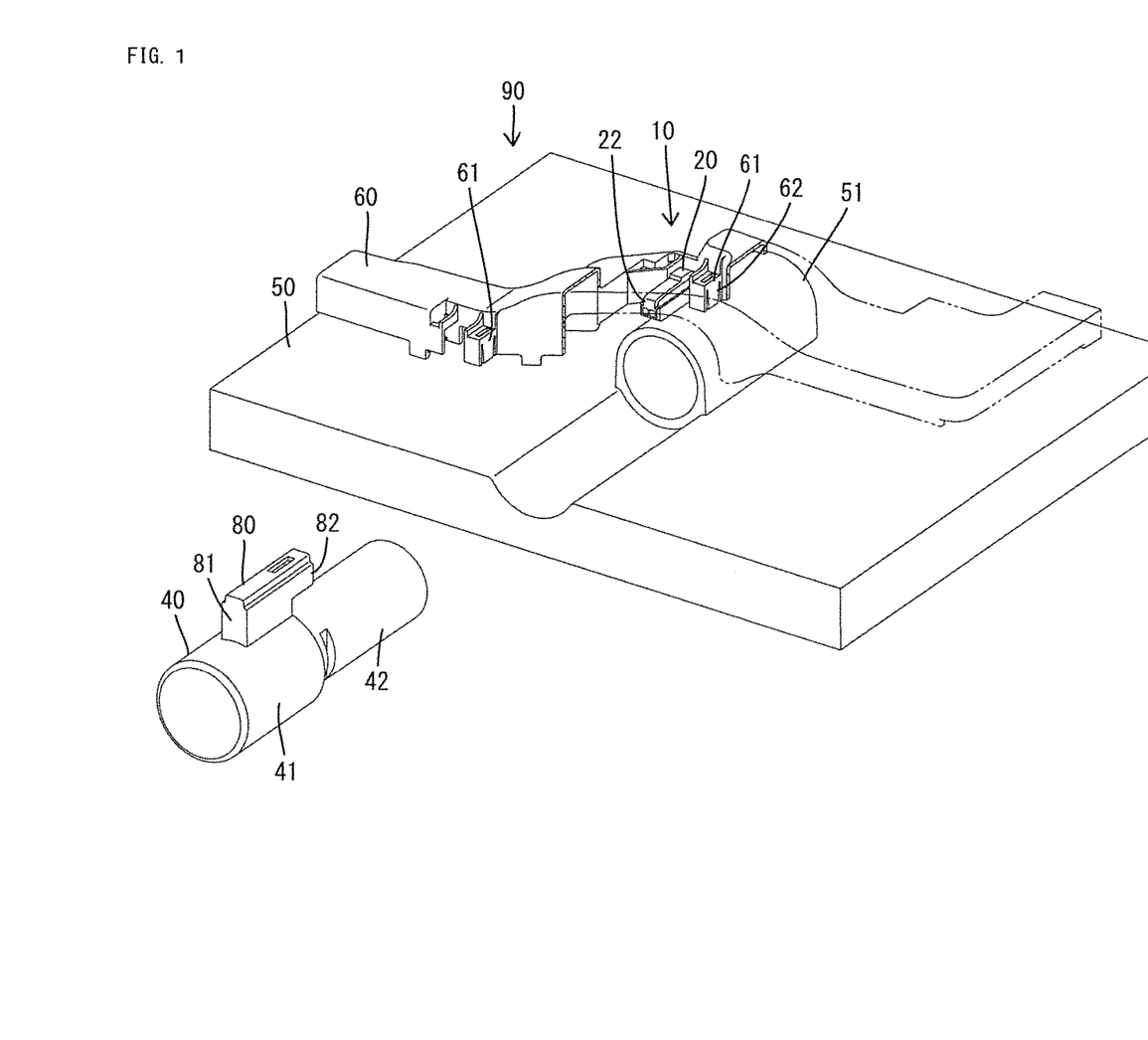
FIG. 1 is a perspective view of a connector of one embodiment of the present invention showing a state where a housing is arranged to face a mating housing before a solenoid is assembled.
Figure 2:
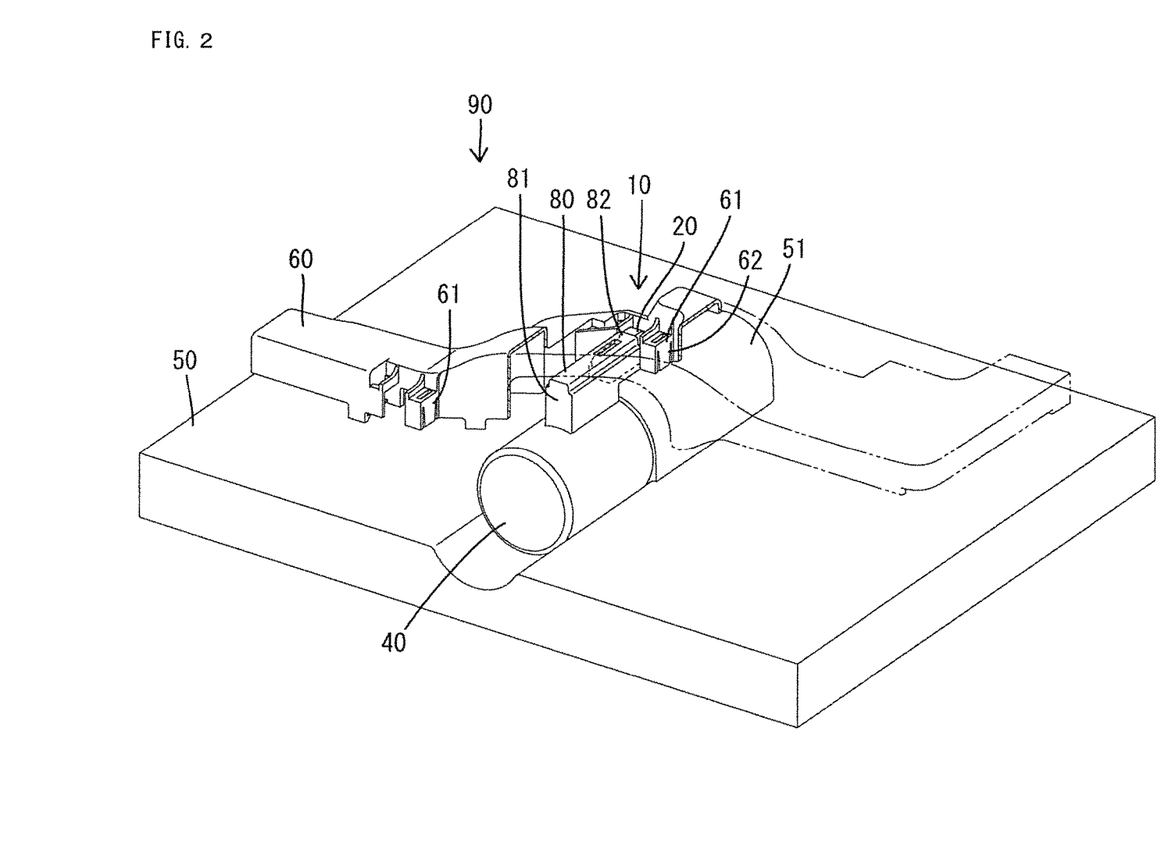
FIG. 2 is a perspective view showing a state where the housing is properly connected to the mating housing as the solenoid is mounted.

As shown in FIGS. 1 and 2, although not shown in detail, the hydraulic control device 90 includes the cover 60 and a valve body 50 arranged below the cover 60 in a laminated manner in a height direction. The valve body 50 is incorporated with a plurality of solenoids 40. A plurality of housings 20 are provided on the cover 60 to correspond to the number of the solenoids 40.

As shown in FIG. 1, the solenoid 40 has a substantially cylindrical shape and includes an electromagnetic portion 41 and a valve portion 42 projecting from the electromagnetic portion 41. A mating housing 80 to be connected to the housing 20 is provided to project in the height direction on the outer peripheral surface of the electromagnetic portion 41. On the other hand, the valve body 50 is provided with a plurality of valve insertion portions 51 into which the valve portions 42 of the solenoids 40 are to be inserted. A hydraulic circuit for a hydraulic control is configured between the valve insertion portion 51 and the valve portion 42.

Figure 5:
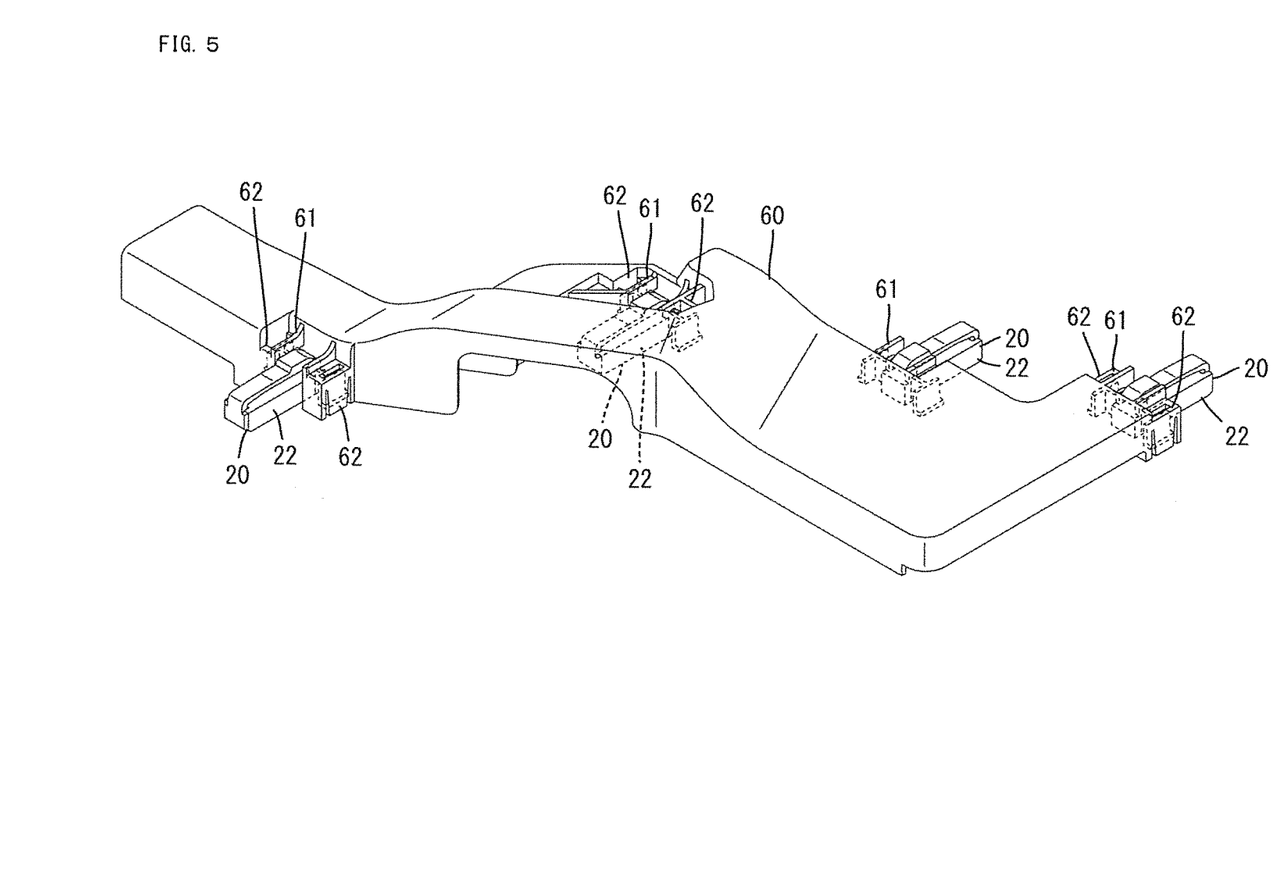
FIG. 5 is a perspective view showing the housing swingably supported on a plurality of swing support portions provided on a cover.

In mounting the solenoid 40 into the valve body 50, a mounting operation of the solenoid 40 and a connecting operation of the connector 10 can be simultaneously performed if the housing 20 is also squarely facing the mating housing 80 with the valve insertion portion 51 squarely facing the solenoid 40. However, if there is a connection error between the housing 20 and the mating housing 80, the mounting operation of the solenoid 40 and the connecting operation of the connector 10 cannot be simultaneously performed. In view of this, in the connector 10 of this embodiment, the cover 60 is provided with a plurality of swing support portions 61 as a mechanism for absorbing a connection error of the housing 20 and the mating housing 80 as shown in FIG. 5.

Figure 6:
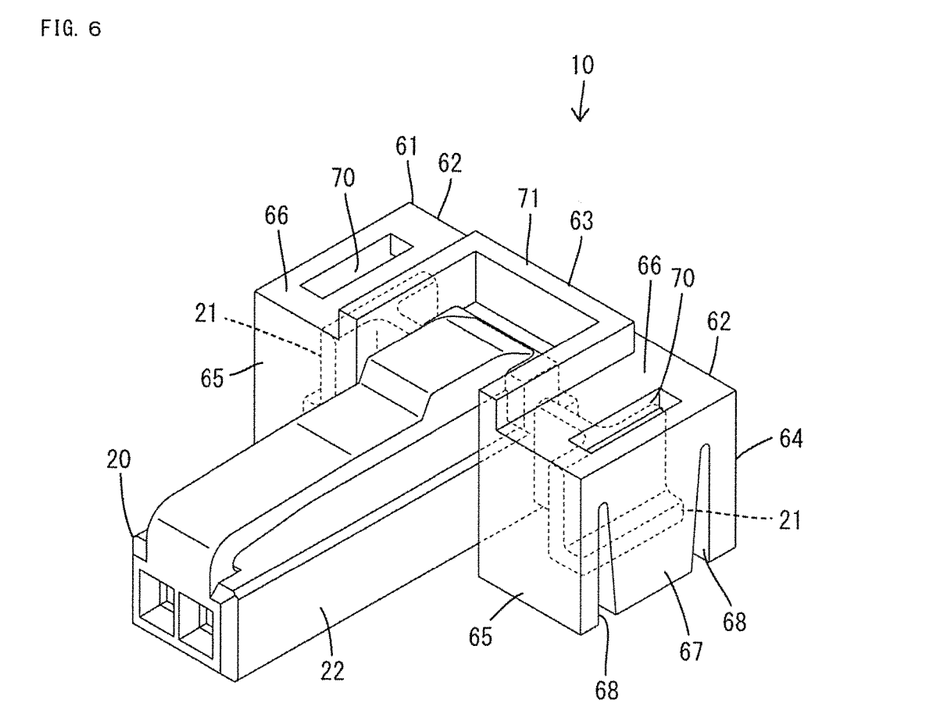
FIG. 6 is a perspective view of the connector when viewed from a front side.
Figure 7:
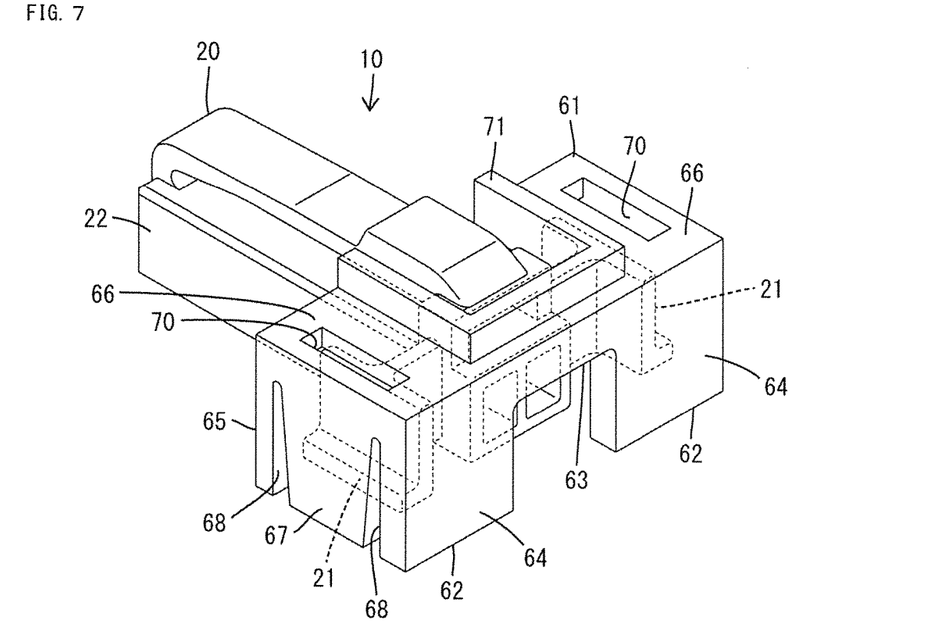
FIG. 7 is a perspective view of the connector when viewed from a back side.
Figure 8:
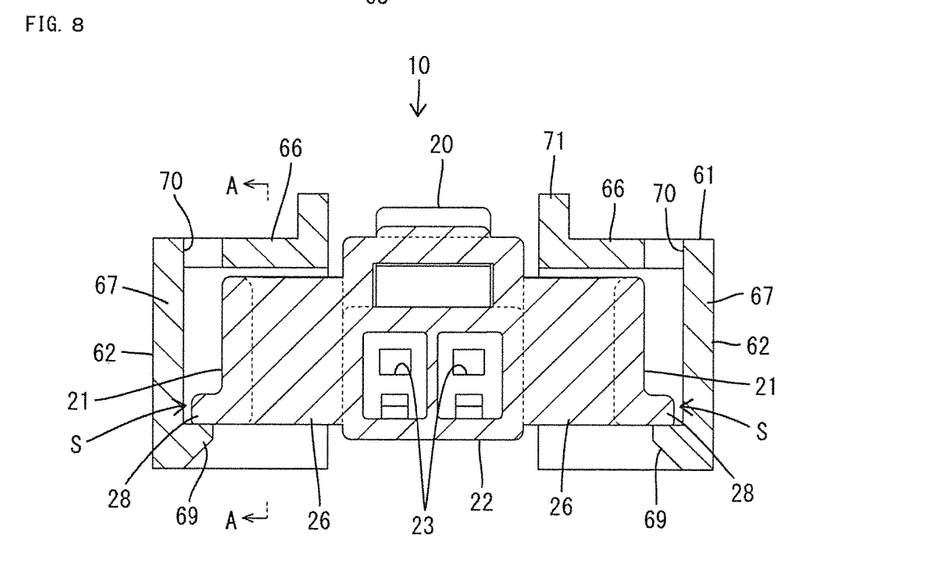
FIG. 8 is a section of the connector when viewed from the back side.
Figure 9:
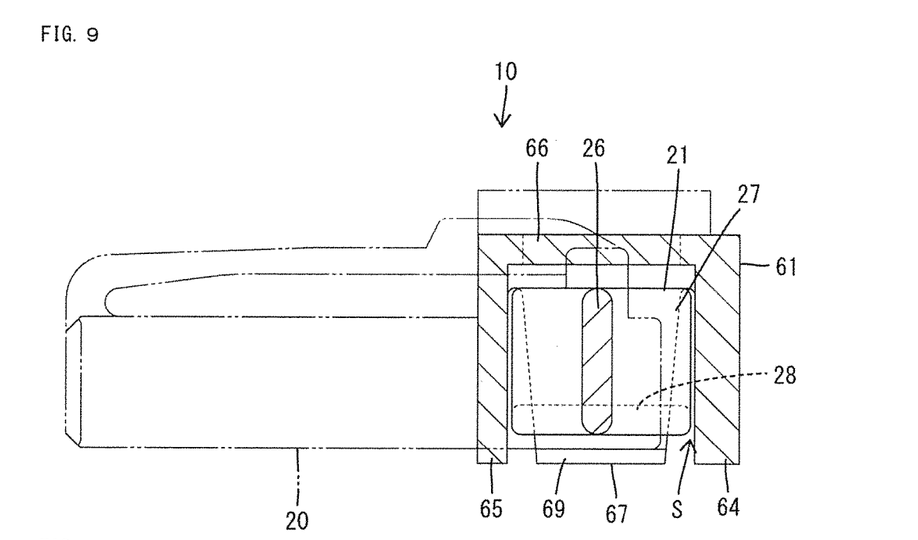
FIG. 9 is a section along A-A of FIG. 8.

As shown in FIGS. 6 to 9, the swing support portion 61 includes a pair of left and right surrounding portions 62 and a coupling portion 63 extending in a width direction (lateral direction) and having both ends coupled to the both surrounding portions 62. The surrounding portion 62 has a substantially rectangular box shape and is composed of a rear surface plate 64, a front surface plate 65 arranged to face the rear surface plate 64 from front, a ceiling plate 66 bridging between upper ends of the front surface plate 65 and rear surface plate 64 and a resilient piece 67 hanging down from an outer end of the ceiling plate 66. Any of the rear surface plate 64, the front surface plate 65 and the resilient piece 67 is in the form of a flat plate. Although the surrounding portions 62 are integrally coupled to other walls of the cover 60 as shown in FIG. 5, coupling structures of the surrounding portions 62 to the other walls of the cover 60 are not shown in FIGS. 6 to 8. As shown in FIGS. 8 and 9, later-described wing portions 21 of the housing 20 are displaceably accommodated in the surrounding portions 62.

As shown in FIGS. 6 and 7, a pair of slits 68 are formed between the resilient piece 67 and the rear surface plate 64 and between the resilient piece 67 and the front surface plate 65, and the resilient piece 67 is resiliently deformable with a coupled part to the outer end of the ceiling plate 66 as a supporting point between the both slits 68. As shown in FIG. 8, a holding projection 69 projecting inwardly of the surrounding portion 62 is provided on the lower end of the resilient piece 67. As shown in FIG. 9, the holding projection 69 is in the form of a rib extending in a front-back direction along the lower end of the resilient piece 67. As shown in FIG. 8, the ceiling plate 66 is formed with a penetrating mold removal hole 70 as a mold passes when the holding projection 69 is molded.

The coupling portion 63 has an extending length slightly longer than a width of a housing main body 22 to be described later. As shown in FIGS. 6 and 7, a standing wall portion 71 extending over the coupling portion 63 and the left and right ceiling plates 66 and bent to be substantially gate-shaped in a plan view is provided on the upper surfaces of the surrounding portions 62. A rear end part of the housing main body 22 is accommodated in inner spaces of the surrounding portions 62 surrounded by the standing wall portion 71. In the case of this embodiment, a plurality of swing support portions 61 are arranged at positions corresponding to the valve insertion portions 51 while being juxtaposed with the valve insertion portions 51 in a height direction.

Figure 3:
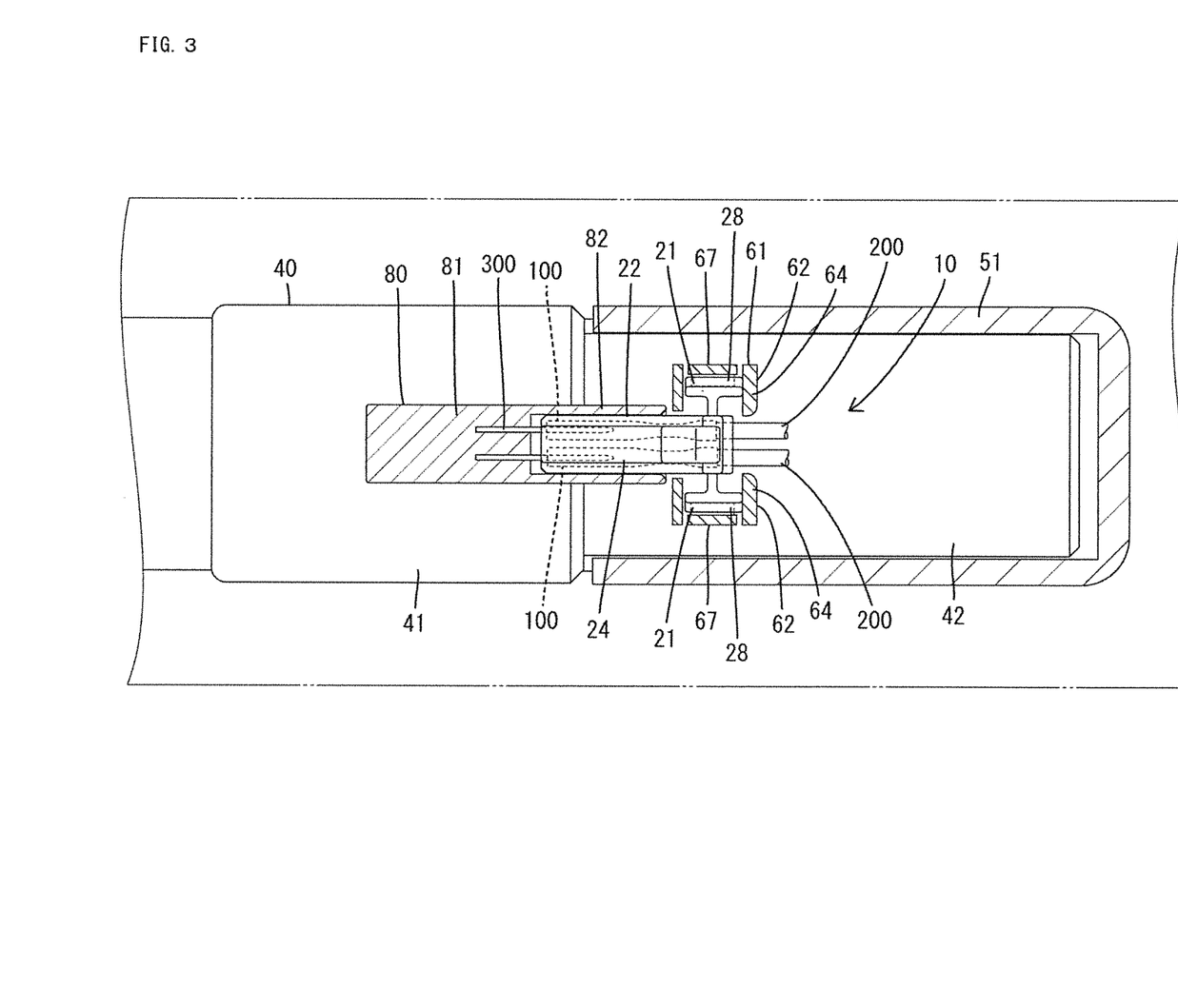
FIG. 3 is a plan view in section of FIG. 2.
Figure 4:
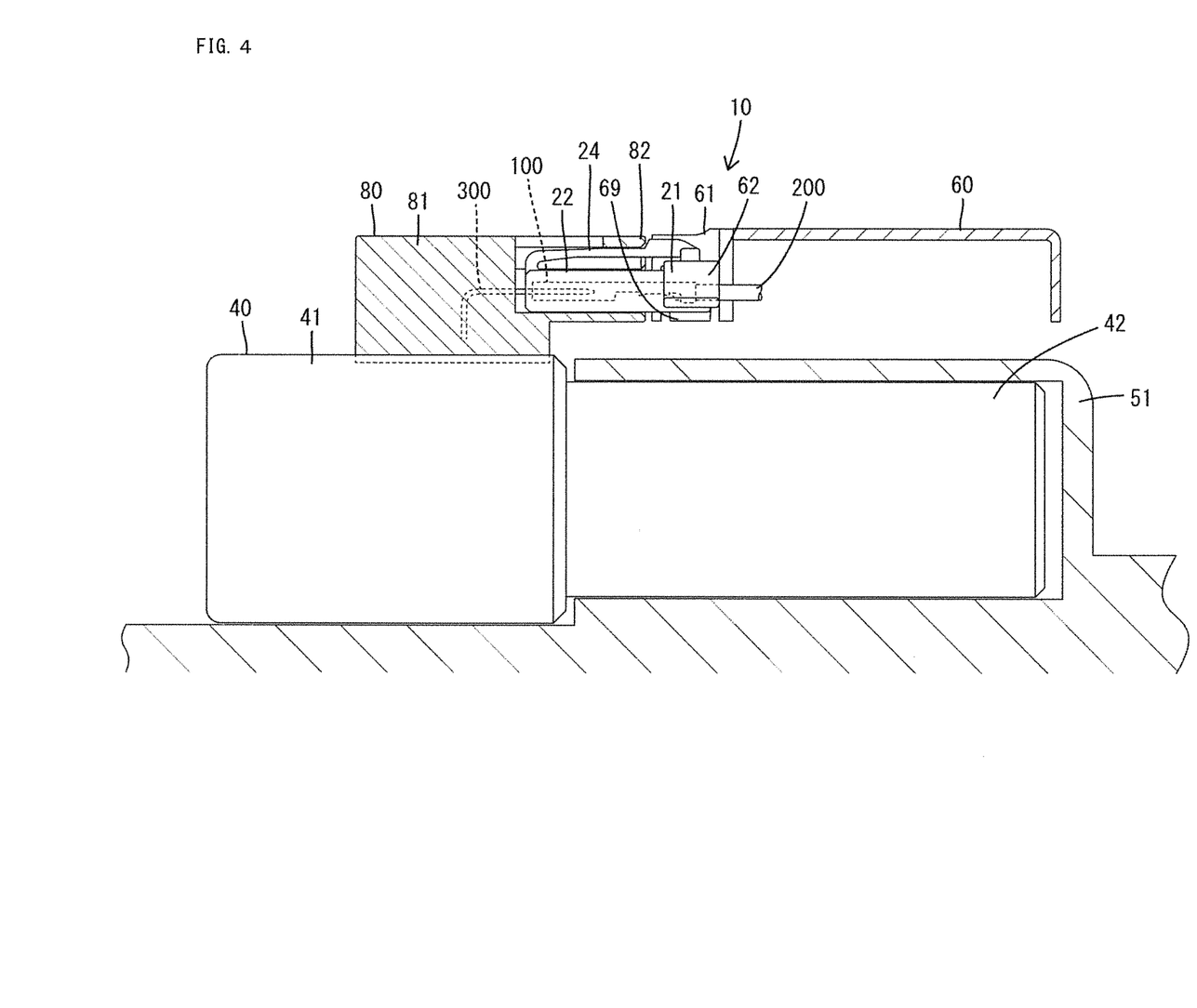
FIG. 4 is a side view in section of FIG. 2.
Figure 10:
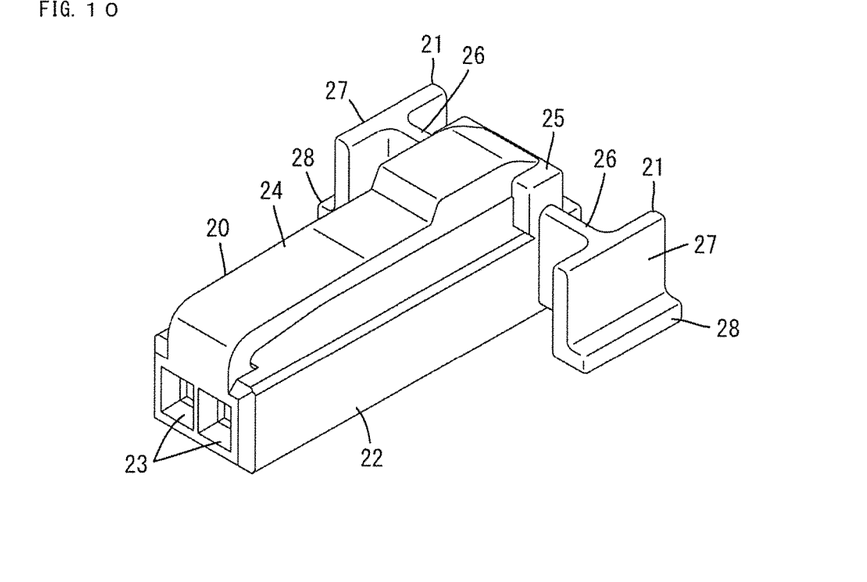
FIG. 10 is a perspective view of the housing when viewed from the front side.
Figure 11:
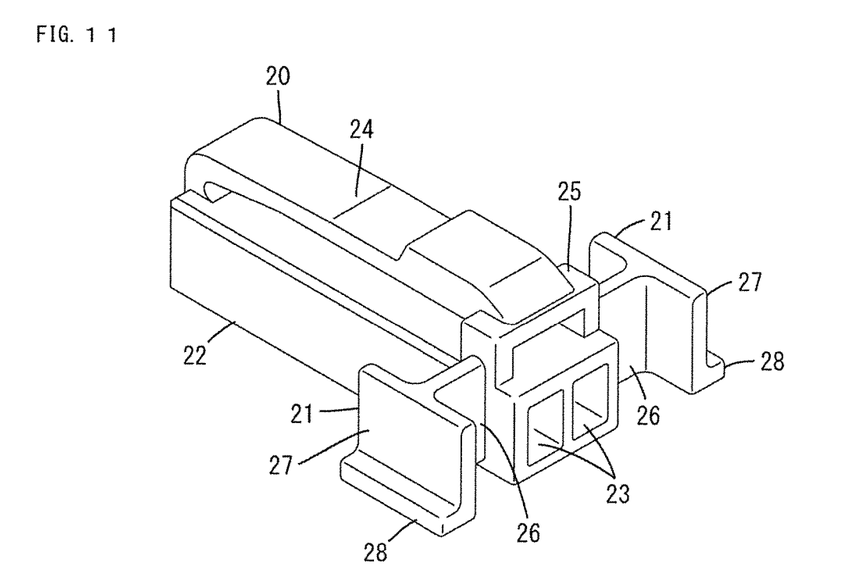
FIG. 11 is a perspective view of the housing when viewed from the back side.
Figure 12:
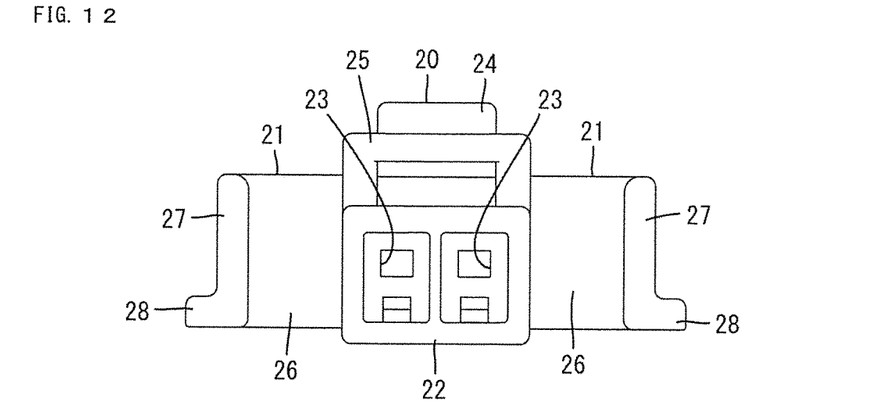
FIG. 12 is a rear view of the housing.

Next, a specific structure of the housing 20 is described. As shown in FIGS. 10 to 12, the housing 20 includes the housing main body 22 substantially in the form of a rectangular block long in the front-back direction and a pair of plate-like wing portions 21 projecting in the width direction from opposite left and right side surfaces of the rear end part of the housing main body 22. The housing main body 22 is provided with two cavities 23 into which terminal fittings 100 (see FIGS. 3 and 4) are insertable. As shown in FIGS. 3 and 4, the terminal fitting 100 is connected to an end part of a wire 200 and the connected wire 200 is pulled out from the rear end of the housing main body 22. Further, the wire 200 pulled out from the rear end of the housing main body 22 is accommodated in the cover 60 and, in that state, arranged in a predetermined direction (direction intersecting with the connecting direction) along the inner surface of the cover 60.

As shown in FIGS. 10 and 11, a resiliently deformable lock arm 24 extending backward after standing up from the front end is provided on the upper surface of the housing main body 22. Further, a protecting portion 25 stands on the upper surface of the housing main body 22 to surround opposite lateral sides and a rear side of a rear end part of the lock arm 24.

As shown in FIGS. 10 and 11, the wing portion 21 includes a first piece portion 26 in the form of a flat plate integrally coupled to the side surface of the housing main body 22 and arranged to extend in the height direction while facing in the front-back direction, and a second piece portion 27 in the form of a flat plate integrally coupled to the outer end of the first piece portion 26 and arranged to extend in the height direction while facing in the width direction. The first and second piece portions 26, 27 are orthogonal to each other and substantially T-shaped in a plan view as a whole. As shown in FIG. 12, protruding portions 28 protruding outward away from the housing main body 22 are provided on the lower ends of the both second piece portions 27. The protruding portion 28 is in the form of a rib extending in the front-back direction along the lower end of the second piece portion 27.

As shown in FIGS. 1 and 3, the mating housing 80 includes a mating housing portion 81 having an arcuate bottom surface along the outer peripheral surface of the electromagnetic portion 41 and a receptacle 82 projecting substantially in parallel to the valve portion 42 from the mating housing portion 81. As shown in FIG. 3, a pair of tab-shaped mating terminal fittings 300 to be electrically connected to the solenoid 40 are mounted in the mating housing portion 81. Tip parts of the mating terminal fittings 300 are arranged to project into the receptacle 82.

Next, the connecting operation of the connector 10 synchronized with the mounting operation of the solenoid 40 is described.

The rear end part of the housing 20 is inserted into the swing support portion 61 from below (see FIG. 5). In the process of inserting the housing 20, the both resilient pieces 67 slide on the both wing portions 21 to be resiliently deformed outwardly. When the housing 20 is properly inserted, the rear end part of the housing main body 22 is arranged inside the standing wall portion 71 and the both wing portions 21 are inserted into the both surrounding portions 62 and the both resilient pieces 67 resiliently return. In this way, the protruding portions 28 of the both wing portions 21 are placed and supported on the holding projections 69 of the both resilient pieces 67 to be latched (see FIGS. 8 and 9). Further, the both wing portions 21 are arranged in the both surrounding portions 62 with clearances S defined in the width and upward directions, and the housing 20 is swingably displaceable in a direction intersecting with the connecting direction (front-back direction) within ranges of those clearances S. At this time, the front ends of the second piece portions 27 of the both wing portions 21 are in contact with the front surface plates 65 of the both surrounding portions 62 and the protruding portions 28 of the both wing portions 21 are in contact with the holding projections 69 of the both resilient pieces 67, whereby the housing 20 is prevented from being inclined forward. Further, the rear ends of the second piece portions 27 of the both wing portions 21 are in contact with the rear surface plates 64 of the both surrounding portions 62, whereby the housing 20 is prevented from moving backward. With the housing 20 floating-supported in the both surrounding portions 62 of the swing support portion 61, each wire 200 pulled out from the housing 20 is arranged along the inner surface of the cover 60. Further, the both wing portions 21 are substantially positioned in such a state as to be swingably displaceable within the ranges of the clearances S of the both surrounding portions 62, whereby the housing 20 projects forward (toward the mating housing 80) from the swing support portion 61 and is arranged at a waiting position where the connecting operation to the mating housing 80 can be started.

Subsequently, the cover 60 having the plurality of housings 20 described above mounted thereon is arranged above the valve body 50 and each housing 20 and each valve insertion portion 51 are juxtaposed in the height direction (see FIG. 1). Subsequently, the valve portion 42 of the solenoid 40 is inserted into the valve insertion portion 51 (see FIGS. 2 to 4). At this time, if the valve portion 42 of the solenoid 40 is squarely facing the valve insertion portion 51 and the housing 20 is squarely facing the mating housing 80, the housing main body 22 of the housing 20 is properly fitted into the receptacle 82 of the mating housing 80 and the two housings 20, 80 are held in a connected state as the valve portion 42 of the solenoid 40 is inserted to a proper depth into valve insertion portion 51. At this time, the lock arm 24 resiliently comes into contact with the inner surface of the receptacle 82, thereby suppressing the rattling of the two housings 20, 80 in the connected state.

On the other hand, even if the mating housing 80 is not squarely facing the housing 20 and a connection axis of the housing 20 is deviated or inclined with respect to the mating housing 80 with the valve portion 42 of the solenoid 40 squarely facing the valve insertion portion 51, a front end part of the housing main body 22 is guided into the receptacle 82 and shallowly inserted, whereby the housing 20 is swingably displaced within the ranges of the clearances S of the wing portions 21 in the surrounding portions 62 and guided to a proper connection position to the mating housing 80. When the two housings 20, 80 are properly connected, the terminal fittings 100, 300 are properly electrically conductively connected.

In the above case, if the housing 20 is largely inclined according to a movement of the mating housing 80, the first piece portions 26 of the wing portions 21 are deformed in a twisting direction intersecting with the connecting direction with respect to the second piece portions 27 and the housing main body 22 and their twisted state is resiliently cancelled. As just described, since the first piece portions 26 of the wing portions 21 are resilient, a displacement of the housing 20 and the mating housing 80 is smoothly and properly corrected. Thus, if the housing 20 is displaced relative to the mating housing 80 when the connection of the two housings 20, 80 is started, the connecting operation of the connector 10 can be performed in synchronization with the mounting operation of the solenoid 40. Thereafter, the solenoid 40 is retained and fixed to the valve body 50 via a fixing means (not shown).

As described above, according to this embodiment, the housing 20 can reach the proper connection position to the mating housing 80 via the swing support portion 61 at the same time as the solenoid 40 is mounted into the valve body 50. Thus, it is not necessary to separately perform the mounting operation of the solenoid 40 and the connecting operation of the connector 10 and assembling operation efficiency is improved. Particularly, since the housing 20 is made swingably displaceable in the direction intersecting with the connecting direction by the swing support portion 61, a displacement between the housing 20 and the mating housing 80 can be properly corrected and the connecting operation of the connector 10 can smoothly proceed.

Further, since the swing support portion 61 is provided on the cover 60 for covering the wires 200, it is not necessary to separately provide the cover 60 and the swing support portion 61 and the entire configuration is simplified and the number of components is reduced.

The present invention is not limited to the above described and illustrated embodiment. For example, the following modes are also included in the technical scope of the present invention.

The swing support portion has only to support the housing swingably in a direction intersecting with the connecting direction and may not be integrally provided to the cover.

The resilient piece may be omitted from the surrounding portion of the swing support portion, a substantially resiliently undeformable latching piece may be provided instead of the resilient piece, and the wing portion of the housing may be provided with a part having a structure equivalent to the resilient piece and to be resiliently locked to the latching piece.

The wing portion of the housing may have such rigidity as to be substantially resiliently undeformable. For example, the wing portion may be formed into a block shape.

LIST OF REFERENCE SIGNS

10 . . . connector
20 . . . housing
21 . . . wing portion
40 . . . solenoid
50 . . . valve body
60 . . . cover
61 . . . swing support portion
62 . . . surrounding portion
80 . . . mating housing
100 . . . terminal fitting
200 . . . wire

The invention claimed is:

1. A connector, comprising:
a housing connectable to a mating housing disposed on a solenoid, the housing having opposite first and second side surfaces and first and second wings projecting respectively from the first and second side surfaces of the housing; and
a swing support portion arranged on a side where a valve body to be mounted with the solenoid is located and configured to support the housing swingably in a direction intersecting with a connecting direction and cause the housing to be connected to the mating housing as the solenoid is mounted into the valve body, the swing support portion including first and second surrounding portions for surrounding the respective first and second wings, the first and second surrounding portions being dimensioned so that the respective first and second wings are accommodated displaceably in the respective first and second surrounding portions.

2. The connector of claim 1, wherein the swing support portion is integrally provided to a cover for covering a wire pulled out from the housing.

3. The connector of claim 2, wherein the wings are twisted and deformed in a direction intersecting with the connecting direction when the housing swings according to a movement of the mating housing and have resilience capable of cancelling a twisted state thereof.

4. The connector of claim 1, wherein the wing portions are twisted and deformed in a direction intersecting with the connecting direction when the housing swings according to a movement of the mating housing and have resilience capable of cancelling a twisted state thereof.

\* \* \* \* \*